S. L. ALLEN.
POTATO DIGGER.
APPLICATION FILED FEB. 21, 1912.
1,073,012.
Patented Sept. 9, 1913.
2 SHEETS—SHEET 1.
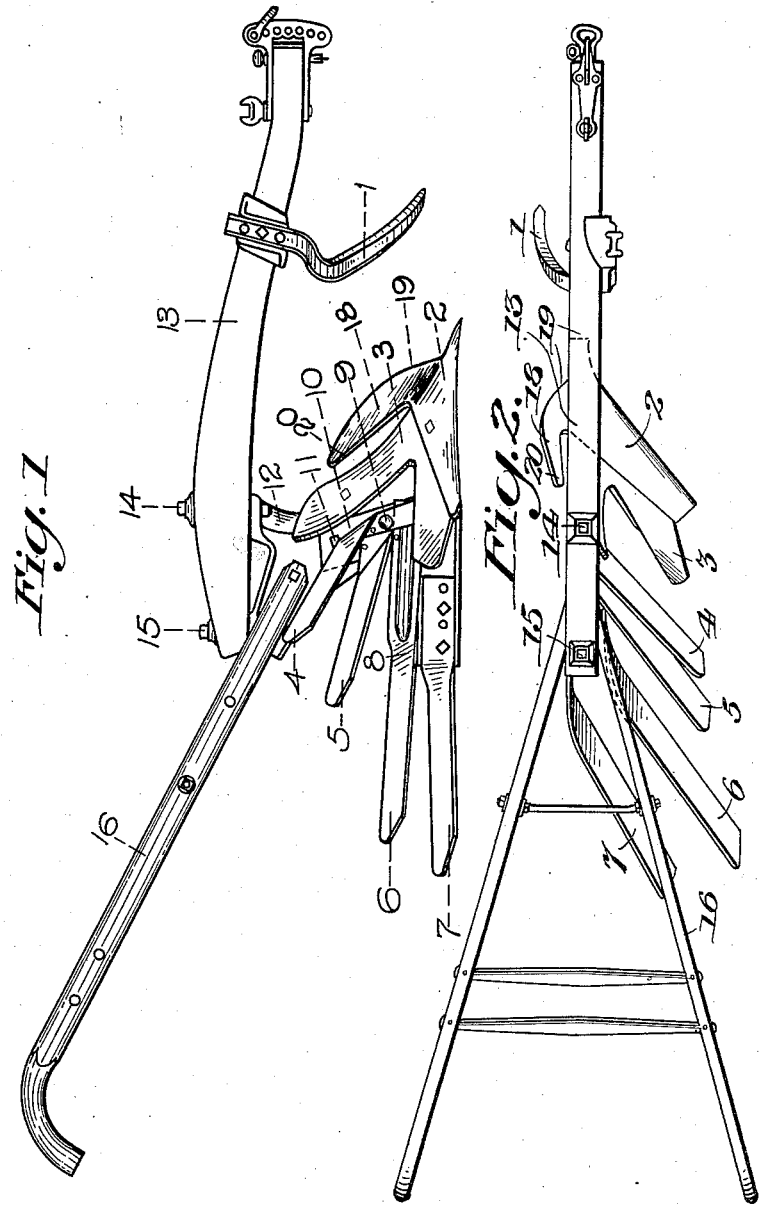

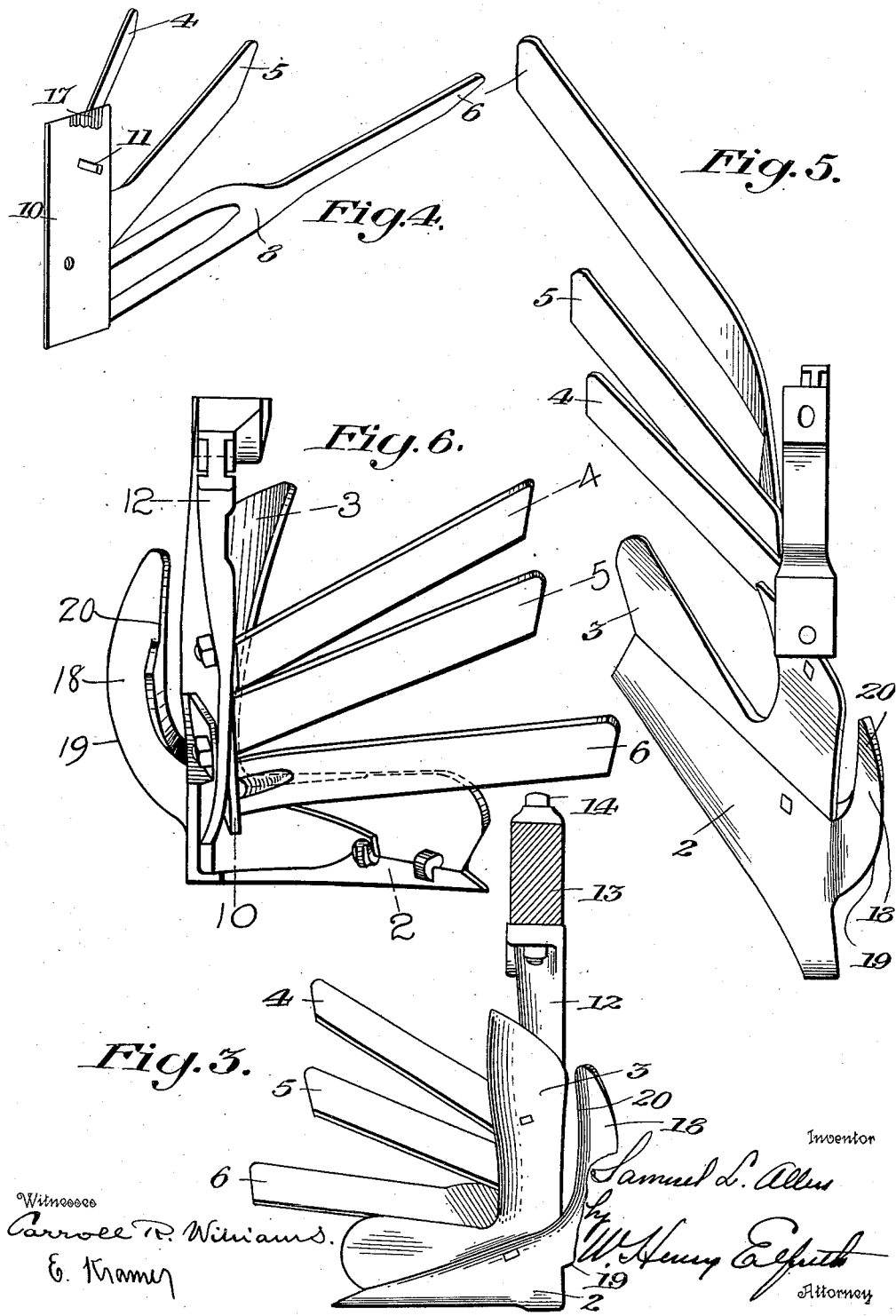

UNITED STATES PATENT OFFICE.

SAMUEL L. ALLEN, OF MOORESTOWN, NEW JERSEY.

POTATO-DIGGER.

1,073,012.          Specification of Letters Patent.          Patented Sept. 9, 1913.

Application filed February 21, 1912. Serial No. 679,168.

*To all whom it may concern:*

Be it known that I, SAMUEL L. ALLEN, a citizen of the United States, residing at Moorestown, in the county of Burlington and State of New Jersey, have invented certain new and useful Improvements in Potato-Diggers, of which the following is a specification.

My invention relates to certain improvements in that class of agricultural implements known as potato diggers adapted to the work of turning a furrow-slice and manipulating and disintegrating the earth thereof in such a manner as to separate the potatoes from it and leave them lying exposed to view on the surface of the ground and ready for gathering.

The primary object of my invention is to provide a system of supplementary plow-shares so arranged as to accomplish the result hereinbefore mentioned.

My present invention contemplates the employment of a skeleton V shaped mold-board and a plurality of flat shares arranged in the rear thereof, so that the upper one is foremost, and engages the furrow-slice as it leaves the mold-board, cutting off a section of the furrow-slice from its upper edge, a second supplementary share situated at once below and to the rear of the first cuts a further portion from the furrow-slice, and the third, still lower than and to the rear of the second, finishes the work by slicing, turning and throwing upward the remainder of the furrow-slice. I have substituted a perpendicular portion of mold-board for the long outwardly and rearwardly extending mold-board heretofore employed in former constructions, and have substituted for the round or nearly round tines commonly used the flat supplementary plow-shares just referred to. I have also provided a horn like extension on the land side of the plow for the purpose of removing those potatoes which are located on the land side and which heretofore have frequently been lost.

It will be observed that the action of the present digger and the construction of the same are fundamentally different from that type of diggers wherein the potatoes are separated from the earth by the sifting action of a plurality of tines.

For the purpose of illustrating my invention, I have shown in the accompanying drawings one form thereof, since this form best represents the purposes of my said invention, and has been found in practice to give the most satisfactory and reliable results, although it is to be understood that my invention is not limited to the precise arrangement and organization as herein set forth, the invention being equally applicable to diggers of the double mold-board type.

Figure 1 represents a side elevation of a potato digger, embodying the main features of my present invention; Fig. 2 a plan view of the same; Fig. 3 an end elevation; Fig. 4 a detail of the supporting plate and the supplementary adjustable plow-shares attached thereto; Fig. 5 a top view of the supplementary plow-shares on the standard of the plow and the principal mold-board and share, and Fig. 6 a rear horizontal view of the same.

Similar numerals of reference indicate similar parts of the figures.

Referring to the drawings in the particular embodiment of my invention therein shown: 1 is the colter or vine turner attached to the beam 13; 2 is the plow-share; 3 is the mold-board constructed with a large indentation in the shape of V; 14 and 15 are bolts which secure the standard 12 to the beam 13; 16 is the handle frame; 4 is a small supplementary plow-share with a flat surface rigidly attached at one end by means of bolts to the supporting plate 10, said plate being detachable and adjustable with respect to the standard 12. The said supplementary plow-share 4 rakes backwardly, outwardly and upwardly at an acute angle with the fork-plate and with the horizontal. When the potato digger is in action a portion of the earth is cut and divided by the lower edge of the aforesaid plow-share, and the edge being rounded cuts and divides and disintegrates the earth without cutting or otherwise injuring the potatoes which are incased in the earth of the furrow-slice. The earth then works along and over the said supplementary plow-share, and drops behind the digger. The said supplementary plow-share 4, on account of its relatively broad flat surface, tends to produce and does produce two results, *i. e.*, first, it cuts, divides and disintegrates the earth of the furrow-slice, and secondly, it pushes the potatoes up through the disintegrated earth to the surface. These results thus mentioned are due to the fact that the earth is so composed that it can be made to separate and disintegrate by the operation described above, and so works back into the furrow, while on the other hand, the potatoes being bodies of a substance harder than the earth are struck by the flat surface of the advancing supplementary plow-share in such a way as to be separated from the earth, pushed upward, and so deposited on the surface behind the digger.

5 is a second supplementary plow-share with a flat surface, but slightly longer than 4, making a wider cut, and arranged so as to make a slightly smaller angle with the fork-plate, and a slightly smaller angle with the horizontal, than that made by 4, but like 4, 5 is flat with rounded edges, and rakes backwardly, outwardly and upwardly. The base of 5 is in a position at once below and in the rear of the base of 4, and is attached to the supporting plate 10, hereinbefore mentioned.

6 is a third supplementary plow-share with a flat surface, longer than either 4 or 5, in order to cut wide at the wider part of the furrow. One end of the said supplementary plow-share 6 is attached to the fork-plate immediately beneath the base of 5, and extends preferably without raking and without pitch to the point 8. From this point to its outer extremity the said plow-share is pitched, and from the said point to the outer extremity also rakes backwardly, outwardly and upwardly making an angle with the supporting plate 10 slightly smaller than that made with the supporting plate by 5, and making an angle with the horizontal slightly smaller than that made with the horizontal by 5.

Fig. 4 shows in detached detail the supplementary plow-shares 4, 5 and 6, and the plate 10, and the method of attachment and adjustment of the said plate with respect to the standard 12. The plate 10 to which are attached the supplementary plow-shares 4, 5 and 6, is pivoted to the standard 12 by a nut and a bolt 9 as shown in Fig. 1.

11 is an arched slot in plate 10 through which is passed a bolt. The said bolt also passes through the standard 12, and is secured by a nut on the opposite side of the standard. By the device just described, the plow-shares 4, 5 and 6, may be raised and lowered by swinging the supporting plate 10 about the pivot bolt 9 to any extent permitted by the length of the arched slot. Any given notch of the notches 17 of the plate 10 may be made to fit into a tooth on the standard 12, and by this device when the nut of the bolt passing through the slot and the standard is screwed tightly against the standard, the plate and the attached plow-shares are held rigidly in a given position.

The action of the potato digger is as follows: The colter removes the vines of the potato plants from the land side and so prevents a clogging of the vines at the point of contact with the principal mold-board or plow-share or beam, any or all of them. The principal plow-share and the mold-board cut and turn the soil into a furrow-slice, the top of which comes into contact with the advancing blade of the highest supplementary plow-share 4, which being pitched cuts the earth with its rounded lower edge, and then raises and disintegrates the earth of the furrow-slice, and so separates the potatoes from the earth surrounding them, as hereinbefore described. The supplementary plow-share 4 is so placed as to cut off the highest part of the furrow-slice turned. As a matter of practice and experiment it has been found that the second plow-share is located in a position high enough to separate and disintegrate the center of the top of the average furrow-slice, while the plow-share 4 separates only the upper portion of the furrow-slice. The plow-share 5 is arranged so as to cut and disintegrate the middle portion of the furrow-slice. The plow-share 6 is designed to cut and disintegrate the remainder and lowest portion of the furrow-slice.

7 is an auxiliary long flat blade designed to push up and throw out the potatoes in the earth of the furrow-slices which drop from the supplementary plow-shares 4, 5 and 6, any or all of them, or earth which may have passed over or between the said supplementary plow-shares.

For the purpose of removing the occasional potatoes which may be found upon the land side of the plow there is provided a horn like extension 18 preferably integral with the main plow-share 2, and having its outer margin 19 curved with respect to the land side of the plow, first outwardly, then upwardly and inwardly and terminating near the top of the mold-board as clearly shown in the drawings. The inner margin 20 of the horn like extension 18 is located parallel to and a slight distance from the land side of the plow so as to leave a space through which a portion of the earth may pass, or which in any event will serve to more thoroughly manipulate the earth which is taken up and acted upon by the extension 18. The working surface of the extension 18 is preferably a continuation of the working surface of the main plow-share 2 and the mold-board 3. It should also be noted that the outer margin of the extension 18 starts from a point some distance above the lower surface of the main plow-share 2 so that a wall of earth is left for the land side to bear against.

It will be seen that there is thus provided a simple and efficient apparatus for removing potatoes from the soil which is clearly distinguished from those heretofore used in the provision of the long relatively broad supplemental plow-shares which are so arranged and disposed as to effectively manipulate and disintegrate the earth and push the potatoes therefrom, as contra-distinguished from the sifting action of the potato digger having narrow tines or forks arranged in the rear of the main plow-share and mold-board. It will also be seen that the horn like extension will take up a portion of the earth on the land side of the plow and turn the same into the furrow slice, a part of which, however, may fall through the space between the inner margin of the extension and the land side of the plow, and the potatoes which may thus be located on the land side of the plow will be effectively removed and thrown to the surface.

Having thus described my invention, what I claim as new and desire to secure by Letters Patent is:—

1. In a digger a combination with a plow of means of breaking up and disintegrating the earth turned up by the plow, said means consisting of a plurality of supplementary plow-shares adjustably attached to the standard of the plow, and extending laterally from one side, and a projection having a free extension from the other side.

2. The combination with a plow of a mold-board a plow-share, adapted to cut a vertical wall and provided with means to gouge said vertical wall and direct the earth into the path of the mold-board and supplementary plow-shares adjustably attached to the standard of the plow.

3. The combination with a plow of a V shaped mold-board having its oppositely directed arms substantially of uniform width throughout their extent and supplementary plow-shares adjustably attached to the standard of the plow.

4. The combination with a plow of a mold-board having differently directed arms of substantially uniform width and broad supplementary plow-shares arranged in position in the rear of the said mold-board, said supplementary plow-shares being pitched and raking outwardly, upwardly and rearwardly from the standard of the plow, and substantially filling the space between the path of the arms of said mold-board and said supplementary plow-shares being adjustably attached to the standard of the plow.

5. The combination with a plow of a V shaped mold-board and supplementary plow-shares arranged in a position in the rear of the said V shaped mold-board, said supplementary plow-shares being pitched and raking outwardly, upwardly and rearwardly from the standard of the plow, and said supplementary plow-shares being adjustably attached to the standard of the plow, said adjustment being oscillatory.

6. The combination with a plow of a mold-board and supplementary plow-shares attached to an adjustable plate, said plate being oscillatably adjustable about a fixed axis and limited in its oscillatory movement.

7. The combination with a plow of supplementary plow-shares attached to an adjustable plate with a V shaped mold-board provided with a perpendicular arm, said plate being mounted to oscillate about a fixed pivot and having a slot remote therefrom for rotary adjustment.

8. The combination with a plow and its point and share of a plurality of supplemental shares, fixed at the rear of the main share, the first being the highest, the second lower than and to the rear of the first, and the third lower than and to the rear of the second, and a plate for carrying said supplemental shares in rotatively adjustable relation to the main share.

9. The combination with a plow and its point and share of a plurality of shares, fixed at the rear of the main share, and means projecting from the land side of said plow for lifting objects over the said main share.

10. The combination with a plow of supplementary plow-shares in a position to the rear of the principal mold-board and principal plow-share, said supplementary plow-shares being flat, pitched and raking backwardly, outwardly and upwardly, and a horn-like projection extending from the plow opposite to said supplementary plow-share, operative to direct objects in the earth over the face of said mold-board.

11. The combination with a plow of a V shaped mold-board, the upper portion of the said mold-board being below the highest point of the standard of the plow, and the upper portion being comparatively short and narrow, and the lower portion being also comparatively short and narrow, and having a V shaped indentation being comparatively large, and a plurality of supplementary plow-shares.

12. The combination with a plow of supplementary plow-shares in a position to the rear of the mold-board and principal plow-share, said supplementary plow-shares being flat, pitched and raking backwardly, outwardly and upwardly and being provided with dull edges, and being adjustably attached to the standard of the plow, and being both independently and collectively adjustable relative to said principal share.

13. The combination with a plow of a V shaped mold-board, the upper portion of the said mold-board being below the highest point of the standard of the plow, and the upper portion being comparatively short and narrow, and the lower portion being also comparatively short and narrow, and a plurality of supplementary plow-shares, said supplementary plow-shares being adjustably attached to the standard of the plow.

14. The combination with a plow of a colter like projection on the share thereof, having a spirally curved projection extending from the landside of the share in spaced relation to the vertical plane thereof.

15. The combination with a plow of a colter like extension on the share thereof having a curved outer margin commencing at a point a short distance above the base of the plow and extending first outwardly, then upwardly and inwardly and terminating near the top of the mold-board.

16. The combination with a plow of a colter like extension on the share thereof having a curved outer margin commencing at a point a short distance above the base of the plow and extending first outwardly, then upwardly and then inwardly and terminating near the top of the mold-board, and having an inner margin extending substantially parallel to and a short distance from the front end of the mold-board of the plow, and having its working surface substantially a continuation of the working surface of the plow-share and mold-board.

17. In a plow the combination of a plow-share, a mold-board having a V shaped indentation in the rear, and a colter like projection on the share, extending substantially parallel with said mold-board, but spaced therefrom.

18. In a plow the combination of a plow-share, a mold-board, having a V shaped indentation in the rear, a colter like extension on the share projecting therefrom, and recurved toward the plane thereof, and a plurality of supplementary plow-shares arranged in the rear of the mold-board.

In testimony whereof I have hereunto set my hand in the presence of two subscribing witnesses.

SAMUEL L. ALLEN.

Witnesses:
J. J. ELDRIDGE,
W. N. BARNES.

---

Copies of this patent may be obtained for five cents each, by addressing the "Commissioner of Patents. Washington, D. C."